Aug. 1, 1950     W. W. HENNING     2,517,429

MASTER JOINT STRUCTURE FOR TRACK CHAINS

Filed Feb. 26, 1948     2 Sheets-Sheet 1

Inventor.
William W. Henning
Paul O. Pippel
Atty.

Aug. 1, 1950  W. W. HENNING  2,517,429
MASTER JOINT STRUCTURE FOR TRACK CHAINS
Filed Feb. 26, 1948  2 Sheets-Sheet 2

Inventor.
William W. Henning
Paul O. Pippel
Atty.

Patented Aug. 1, 1950

2,517,429

UNITED STATES PATENT OFFICE 2,517,429

MASTER JOINT STRUCTURE FOR TRACK CHAINS

William W. Henning, Riverside, Ill., assignor to International Harvester Company, a corporation of New Jersey Application February 26, 1948, Serial No. 11,243

6 Claims. (Cl. 305—10)

This invention has to do with track chains for crawler tractors and relates more particularly to improvements in a master joint structure for such chains.

A conventional type of track chain for crawler tractors comprises laterally spaced pairs of track links. Corresponding end portions of the links in each pair are offset outwardly, whereas end portions at the opposite ends of the links in each pair are offset inwardly. This arrangement makes it possible to assemble the pairs of links in a chain wherein the inwardly offset ends of each pair of links are disposed between the outwardly projecting end portions of the succeeding pair of links. Each of these offset portions of the links contain holes. Concentric bearing members are assembled with these holes at each joint in the chain. The holes in the inwardly offset link end portions in each joint are pressed onto respective end portions of the outer of the concentric bearing member of such joint, whereas the holes of the associated outwardly projecting end portions of the adjacent pair of links are pressed onto outer end portions of the inner of the two concentric bearing members of such joint. The links are pressed into rigid assembly with their respective concentric members, a hydraulic press sometimes being used for pressing the links onto such members, so that there is no pivotal movement between the links and the concentric members to which they are respectively attached, and, so the links will not slide from the ends of their concentric members. Relative pivotal movement does occur, however, between the concentric members, and this sliding pivotal movement of the concentric members upon one another has required the use of lubricants to prevent excessive wear. Maintenance of a thoroughly lubricated condition of these pivoted points in crawler tractors track chains has proved difficult. Furthermore, complete exclusion of dirt and other abrasive foreign particles from between the bearing surfaces has been impossible because of the very nature of the use of track chains upon the ground within a zone of high dust concentration, or, at times beneath the surface of a mire or muddy water.

These problems of providing lubrication for the joints and track chains and the unsatisfactory attempts to exclude abrasive particles from the moving parts of the joints has led to the development of a joint structure wherein the relatively pivotable concentric parts are in the form of concentric sleeves having a bushing of rubber-like material telescoped therebetween and having its inner periphery non-slidably associated with the outer periphery of the inner sleeve and its outer periphery in non-slidable association with the inner periphery of the outer sleeve. Relative pivotal movement of the inner and outer sleeves is obtained pursuant to distorting the rubber bushing incident to placing internal stress therein. Because of the rubber bushing completely filling the space between the concentric sleeves in this type of joint structure and exerting compressive force against the contiguous peripheries of the pivotable sleeves, foreign abrasive particles are completely excluded. Since no sliding parts are present there is no need for lubrication.

A concentric sleeve assembly of this character is known in the industry as a track joint cartridge. The inwardly turned ends of a pair of track links are pressed onto end portions of the outer sleeve of the cartridge and at most of the joints the outwardly turned ends of the associated pair of track links are pressed onto outwardly projecting end portions of the inner sleeve of the cartridge. To fasten the two ends of the chain together a master joint structure is employed for making it possible to readily connect and disconnect such ends of the chain. In such a joint the end of the chain terminating with inwardly projecting ends of a pair of track links has the holes in such inturned ends of the links pressed onto respective end portions of the outer sleeve of the cartridge. The inner sleeve of this cartridge, however, can be no longer than the outer sleeve, for if it were longer it would be impossible to assemble the outwardly turned ends of the links at the other end of the chain onto these ends of the inner sleeve. The present invention concerns this problem and the general object of the invention is the provision of means for rigid attachment of end portions of a track chain with outer end portions of the inner concentric member of a master joint cartridge.

A further object is to provide an attaching means of the character that does not project materially outwardly of holes in the track links which facilitate attachment of these links to the inner concentric member of the track joint structure.

Still a further object is the provision of a master joint structure employing a tension member extending through and piloted in the inner of the concentric relatively pivotable members, together with means relatively advanceable axially of the tension member for non-rotatable connection with the ends of the inner concentric member and wedge means expandable into engagement with holes within the links being attached to the inner concentric member.

The above and other desirable objects inherent in and encompassed by the invention will be more readily understood from the ensuing description and the annexed drawings, wherein.

Figure 1:
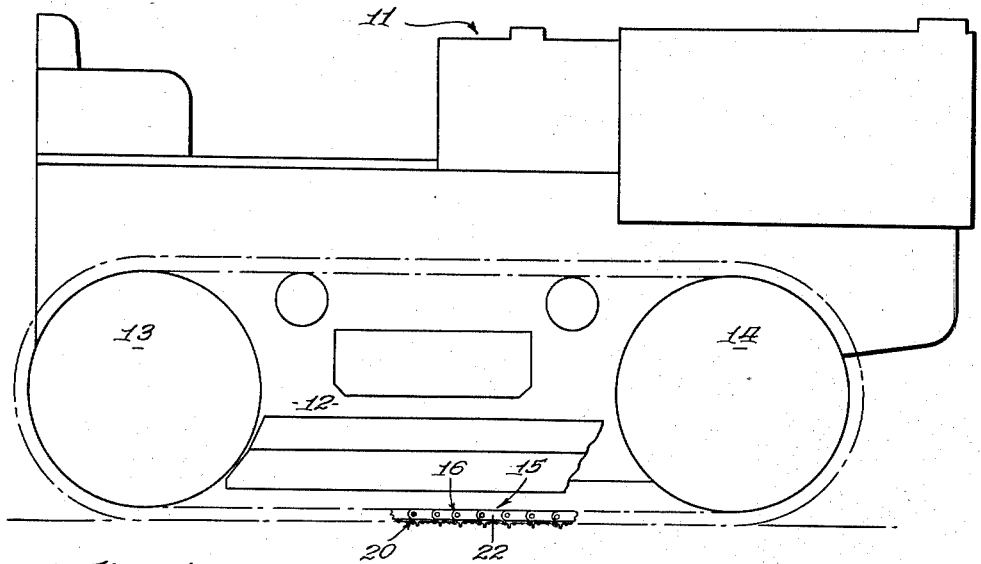
Fig. 1 is a diagrammatic side elevational view of a crawler tractor employing a track chain wherein an embodiment of the present invention is utilized.
Figure 5:
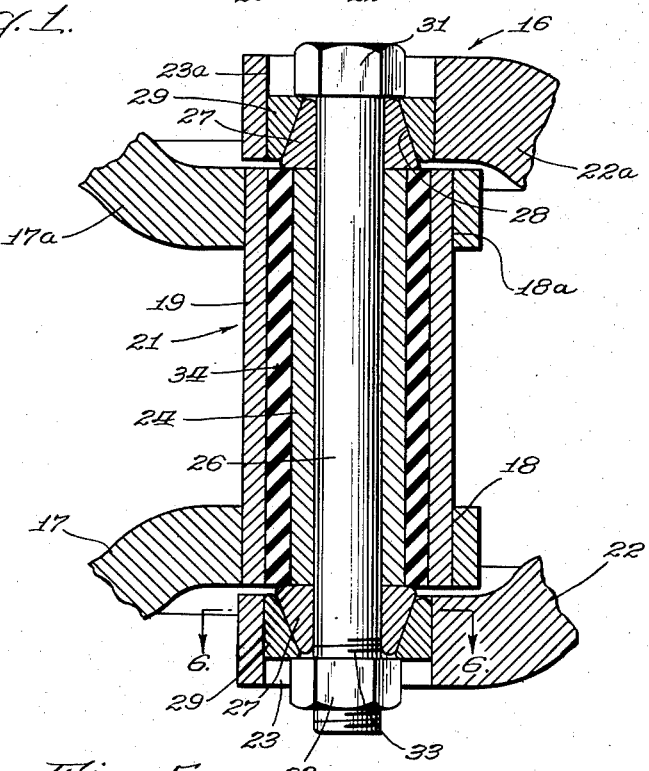
Fig. 5 is a fragmentary sectional view taken on the line 5—5 of Fig. 3.

In Fig. 1 there is shown a crawler tractor 11 having a track frame 12 which rotatably supports a rear driving sprocket 13 and a front idler sprocket 14 for an endless track 15 trained over these sprockets. A master joint structure 16 at which two ends of the track are pivotally connected together is shown in detail in Figs. 2 to 6 inclusive. One end of the track 15 terminates with a pair of track links 17 and 17a. Inwardly offset opposite end portions of these links 17 and 17a contain openings 18 and 18a which are pressed tightly onto respective end portions of a sleeve 19 which is the outer sleeve element of a joint cartridge structure 21. The opposite end of the chain 15 terminates in a pair of links 22 and 22a. Outwardly offset end portions of the links 22 and 22a contain openings 23 and 23a which are arranged endwise outwardly from an inner sleeve 24 of the cartridge 21 and in substantial coaxial relation therewith.

In other joint structures, 20, of the chain 15, Fig. 1, cartridge corresponding to the cartridge 21 have an outer sleeve of the same length as the sleeve 19 and an inner sleeve 25 (Fig. 2) corresponding to the sleeve 24, but longer than the outer sleeve so as to project endwise beyond each end thereof sufficiently for the apertured outwardly offset end portions of the associated track links as 22 and 22a to be pressed tightly thereonto. Each pair of links as 17—17a and 22—22a is offset outwardly at one end, the left end as viewed in Figs. 2 and 5, and are offset inwardly at their opposite ends wherefore the left ends of each pair of links embrace the inwardly offset ends at the right ends of the pair of links immediately to the left thereof. In this respect the master joint structure 16 is similar to the other joint structures 20.

A tension member in the form of a bolt 26 is inserted through and piloted in the inner sleeve 24 of the master joint structure 16. A pair of connecting means components in the form of collars 27 are carried by the shank of the bolt 26 at opposite ends of the inner sleeve 24. These collars or wedge elements 27 have conical outer peripheries 28 in opposed radially spaced relation with the cylindrical inner peripheries of the openings 23 and 23a, respectively. These conical peripheries of the collars 27 taper axially outwardly toward their respective ends of the bolt shank. Torque transmitting structures in the form of split rings or wedge elements 29 are interposed between the inner peripheries of the link openings 23 and 23a and the tapered peripheries of the connecting means components 27. A head 31 at one end of the bolt shank and a nut 32 upon a threaded portion 33 at the opposite end of the bolt shank are cooperable for advancing the split rings 29 and the collars 27 relatively toward one another axially of the bolt shank for placing the inner ends of such collars in connecting relation with opposite ends of the inner sleeve 24. In the present form of the invention the collars 27 are pressed sufficiently tightly in frictional engagement with the ends of the sleeve for establishing a rigid connection of these collars with the sleeve. Advancing force is imparted to the collars 27 through the split rings 29 which simultaneously are expanded into tight wedging relation between the collars and the cylindrical inner peripheries of the link openings 23 and 23a. Thus a rigid connection is established between each of the links 22 and 22a and the inner sleeve 24.

The cartridge 21 includes a bushing 34 of rubber-like flexible material which is telescopically assembled between the sleeves 19 and 24 under compression of sufficient magnitude that the frictional engagement of the bushing with the two sleeves will preclude relative rotative sliding movement of either sleeve relatively to the bushing. However, the flexible nature of the rubber-like bushing makes it possible to impart limited relative rotative movement to the sleeves. This relative rotative movement of the two sleeves 19 and 24 is sufficient to accommodate the change in angularity between the pairs of links connected together in the joint incident to passing about either of the sprockets 13 or 14 and for the adjacent pairs of links to assume a horizontal coplanar relation while in the ground engaging flight portion and also while in the upper flight portion extending between the sprockets.

Figure 2:
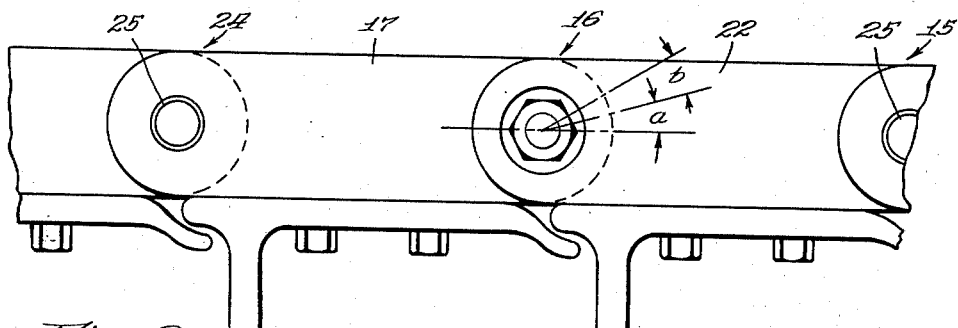
Fig. 2 is a enlarged fragmentary side elevational view of the lower (ground engaging) flight of the track chain shown in Fig. 1.
Figure 3:
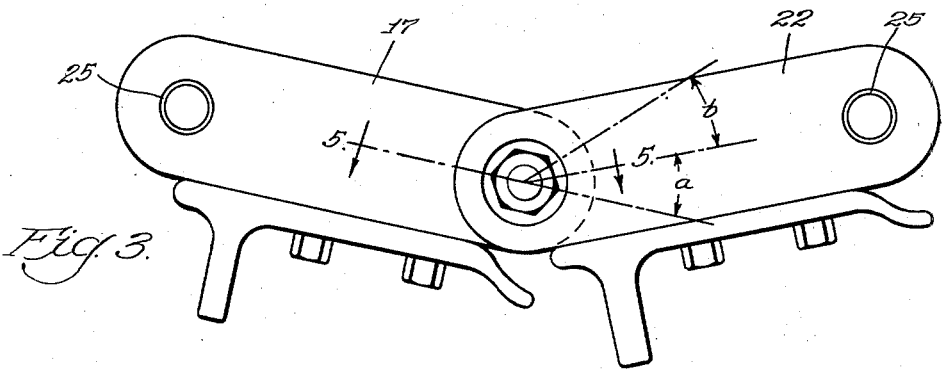
Fig. 3 is a side elevational view of a pair of links pivotally connected by a master joint structure embodying the present invention, this figure illustrating the links in an angular relation occupied when the rubber bushing of the cartridge is relaxed in a pivotal or torsional sense.
Figure 4:
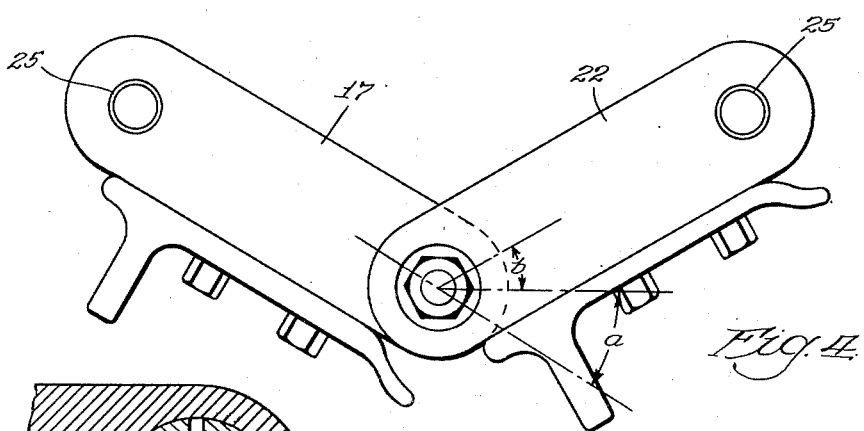
Fig. 4 is a view taken similar to Fig. 3, but showing the track links in the pivotal relation occupied incident to passing about the toothed periphery of a sprocket upon which the chain is installed.
Figure 6:
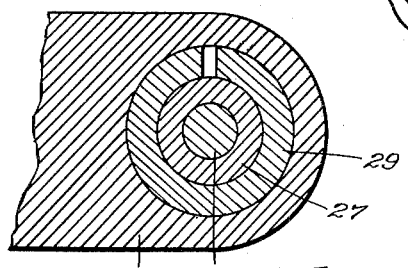
Fig. 6 is a fragmentary transverse sectional view taken on the line 6—6 of Fig. 5.

The amount of stress created in the rubber-like bushings 34 incident to their associated pairs of chain links being moved between a coplanar relation as that illustrated in Fig. 2 and an extreme angular relation as that illustrated in Fig. 4, when passing about either of the sprockets 13 or 14, is minimized by assembling the adjacent pairs of the links with the cartridge 21 in such a manner that these pairs of links assume an angular relation as illustrated in Fig. 3, while the cartridge bushing is in relaxed condition with respect to circumferential stress. Therefore, when a joint structure is located in either of the straight flights of the chain, the bushing 34 thereof will be distorted in one direction by the amount of an angle $a$, and when the joint structure is being passed about the periphery of either sprocket 13 or 14, the rubber bushing will be flexed in the opposite direction in an equal amount through the angle $b$. Excessive strains in the distortable bushing are thus avoided.

In addition to the present invention providing a simple, easily assembled, economical and effective means for rigidly connecting a pair of track links with the inner sleeve of a rubber bushed track link cartridge, the invention further provides for the use of a cartridge wherein the inner sleeve is of no greater length than the outer sleeve wherefore the parts 27 and 29, the bolt head 31, and the nut 32, are substantially within the confines of the cylindrical openings 23 and 23a of the outwardly offset track link portions. Thus the means for rigidly connecting the inner sleeve with its associated track links avoids any substantial projections of parts beyond the normal width of the chain.

The cylindrical openings 23 and 23a by enclosing the outer portions of the means for establishing a connection between the inner sleeve and its associated track links, further provide an effective guard which prevents impairment of the connecting parts by hard objects which might otherwise be struck against by such parts while the chain is in operation.

Having thus described a preferred single embodiment of the invention with the view of clearly and concisely illustrating the same, I claim:

1. In a track joint structure; a sleeve; a track link disposed adjacently to an end of said sleeve and projecting radially thereof, said track link having an opening disposed endwise outwardly from the sleeve in substantial coaxial relation therewith; and means for rigidly attaching the link to the sleeve including a tension member extending through the sleeve and into the link opening, connecting means components on the tension member and relatively advanceable axially thereof into non-rotative relation with respective ends of such sleeve, means on the tension member for so relatively advancing said components, and a torque transmitting sturcture interposed between the inner periphery of the link opening and the connecting means component at the corresponding end of the sleeve to prevent relative pivoting of such link and component.

2. In a track joint structure; a sleeve; a track link disposed adjacently to an end of said sleeve and projecting radially thereof, said track link having an opening disposed endwise outwardly from the sleeve at said end thereof in substantial coaxial relation therewith; and means for rigidly attaching the link to the sleeve including a tension member extending through the sleeve and into the opening of such link, connecting means components on the tension member and relatively advanceable axially thereof into non-rotative relation with respective ends of such sleeve, means on the tension member for so relatively advancing said components, one of said components having a wedging surface in opposed radially spaced relation to the inner periphery of the link opening, and a torque transmitting structure in wedged relation between such wedging surface and the inner periphery of the link opening, and said component advancing means being operable to force the torque transmitting structure into said wedged relation pursuant to the advancement of said component.

3. In a track joint structure; a sleeve; a track link disposed adjacently to an end of said sleeve and projecting radially thereof, said track link having an opening disposed endwise outwardly from said end of the sleeve in substantial coaxial relation therewith; and means for rigidly attaching the link to the sleeve including a tension member extending through the sleeve and into the opening of such link, connecting means components on the tension member and relatively advanceable axially thereof into non-rotative relation with respective ends of such sleeve, means on the tension member for so relatively advancing said components, one of said components having a portion disposed radially inwardly from the inner periphery of the link opening to provide a space therebetween, and a torque transmitting structure wedged into said space to rigidly connect said component and link, and said component advancing means being operable to impart a force axially of the sleeve to the torque transmitting structure to wedge the same as aforesaid pursuant to advancing said components.

4. For use in the joint structure of an articulated track chain employing a pair of relatively pivotal concentric sleeves of substantially the same length to which apertured track links are respectively rigidly attached; means for attaching a pair of such links to respective ends of the inner of such sleeves with the apertures of such links disposed coaxially therewith and outward from their respective ends thereof, comprising a bolt of which the shank projects through and is piloted in the inner sleeve while opposite end portions of the shank are in the apertures of said pair of links, collars respectively on said bolt shank portions and of which the outer peripheries are in radially opposed relation with the inner peripheries of said apertures and are tapered toward their respective ends of the bolt shank, radially expandable torque-transmitting structures disposed between said tapered peripheries and the radially opposed inner peripheries of the associated link apertures, and means upon and cooperable with the bolt shank for advancing said expandable structures toward one another against said collars to press the collars tightly against the ends of the inner sleeve and to wedge said structures tightly between the radially opposed peripheries of the collars and link apertures.

5. For use in the joint structure of an articulated track chain employing a pair of relatively pivotal concentric sleeves of substantially the same length to which there are rigidly attached track links having cylindrical apertures; means for attaching a pair of such links to respective ends of the inner of such sleeves and with cylindrical periphery apertures of such links disposed coaxially therewith and outward from their respective ends thereof, comprising a bolt of which the shank projects through and is piloted in the inner sleeve while opposite end portions of the shank are in the apertures of said pair of links, collars respectively on said bolt shank portions of which the outer peripheries are in radially opposed relation with the inner peripheries of said apertures and are tapered toward their respective ends of the bolt shank, radially expandable torque-transmitting split rings having inner tapered peripheries conforming to and respectively mated with said tapered peripheries of the collars and having cylindrical outer peripheries expandable into conforming frictional engagement with the cylindrical peripheries of the link apertures, and means comprising components upon and cooperable with the bolt shank for advancing the split rings toward one another against the collars to press such collars tightly against the ends of the inner sleeve and to wedge the split rings tightly between the radially opposed peripheries of the collars and link apertures, and said collars, split rings and ring advancing components being disposed substantially within the space embraced by the link apertures.

6. In a track joint structure; a sleeve; a track link projecting radially of said sleeve from a position adjacently to an end thereof and having an opening disposed endwise outwardly from said sleeve in substantial coaxial relation therewith; and means for rigidly attaching the link to the sleeve including a tension member extending through the sleeve and into the opening of such link, radially inner and outer wedge elements disposed in the track link opening, one of said elements being constrained for axial movement with the tension member and said elements being axially compressable between said member and the sleeve pursuant to relative axial movement of said member and sleeve, said elements having complementally engaged surfaces upon which they slide and cause radially outward displacement of the outer element into non-rotative engagement with said track link within the opening thereof pursuant to such axial compression, and manipulatable means comprising an element on the tension member for effecting said relative axial movement of the tension member and sleeve.

WILLIAM W. HENNING.

REFERENCES CITED

The following references are of record in the file of this patent:

UNITED STATES PATENTS

| Number | Name | Date |
|---|---|---|
| 2,078,167 | Shields | Apr. 20, 1937 |